(12) United States Patent
Yamada (10) Patent No.: US 6,614,497 B2
(45) Date of Patent: Sep. 2, 2003

(54) LIQUID CRYSTAL DISPLAY DEVICE HAVING PARTICULAR PIXEL ELECTRODES

(75) Inventor: Tsutomu Yamada, Shin-Shih (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 213 days.

(21) Appl. No.: 09/866,084

(22) Filed: May 29, 2001

(65) Prior Publication Data

US 2002/0180918 A1 Dec. 5, 2002

(51) Int. Cl.[7] .................. G02F 1/1337; G02F 1/1343
(52) U.S. Cl. .................. 349/129; 349/130; 349/146
(58) Field of Search ................. 349/130, 123, 349/146, 129

(56) References Cited

U.S. PATENT DOCUMENTS

| | | | |
|---|---|---|---|
| 2002/0001058 A1 * | 1/2002 | Wang .................. | 349/129 |
| 2002/0063832 A1 * | 5/2002 | Wu et al. .................. | 349/129 |
| 2002/0071080 A1 * | 6/2002 | Taniguchi et al. ............. | 34/139 |
| 2002/0085152 A1 * | 7/2002 | Chuang et al. ............. | 349/123 |
| 2002/0105610 A1 * | 8/2002 | Takeda et al. .............. | 349/129 |
| 2002/0135723 A1 * | 9/2002 | Wong .................. | 349/123 |
| 2002/0159012 A1 * | 10/2002 | Yamada .................. | 349/122 |
| 2002/0163610 A1 * | 11/2002 | Liao et al. .................. | 349/113 |
| 2003/0011729 A1 * | 1/2003 | Song et al. .................. | 349/107 |

FOREIGN PATENT DOCUMENTS

EP  0 884 626 A2  12/1998

\* cited by examiner

*Primary Examiner*—Robert H. Kim
*Assistant Examiner*—Mike Qi
(74) *Attorney, Agent, or Firm*—Dykema Gossett PLLC (57) ABSTRACT

A liquid crystal display device comprising: a first substrate and a second substrate processed for vertical alignment; a liquid crystal having a negative dielectric constant anisotropy and being sandwiched between the first and second substrates; an array of first protrusions on the first substrate, each of the first protrusions being bent in zigzag, the first protrusions being arranged in parallel to one another with a predetermined pitch among them; a plurality of pixel electrodes on the second substrate; and an array of second protrusions or slits provided on the pixel electrodes, each extending in a direction, the second protrusions or slits being arranged in parallel to one another. The liquid crystal display device of the present invention is characterized that the angle included between the edge of the pixel electrodes and the extending direction of the second protrusions or slits is kept at least 135 degrees.

13 Claims, 9 Drawing Sheets

LIQUID CRYSTAL DISPLAY DEVICE HAVING PARTICULAR PIXEL ELECTRODES

BACKGROUND OF THE INVENTION

1. Field of the Invention

The present invention relates to a liquid crystal display (LCD), and more particularly to a vertically-aligned (VA) LCD having a TFT substrate with specific protrusion or slit pattern for suppressing disclination.

2. Description of the Related Art

Vertically-aligned (VA) LCD is a mode using a negative liquid crystal material and vertical alignment film. When no voltage is applied, liquid crystal molecules are aligned in a vertical direction and black display appears. When a predetermined voltage is applied, the liquid crystal molecules are aligned in a horizontal direction and white display appears. Comparing to the twisted nematic (TN) LCD, the vertically-aligned (VA) LCD provides higher contrast, higher response speed, and excellent viewing angle characteristics for white display and black display. However, the VA LCD still has a critical drawback of a narrow viewing angle. This poses a problem that the application of the VA LCD is limited.

It is known that viewing angle performance of a VA LCD can be improved by setting the orientation of the liquid crystal molecules inside pixels to a plurality of mutually different directions. European Patent Publication Number 0884626-A2 discloses a VA LCD having domain regulating means for regulating the orientation of a liquid crystal in which liquid crystal molecules are aligned obliquely when a voltage is applied so that the orientation will include a plurality of directions within each pixel.

Figure 1A:
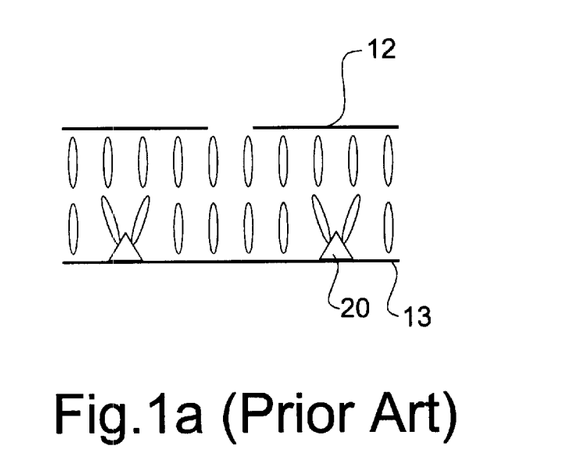
FIGS. 1a to 1c are diagrams for explaining a panel structure and an operational principle of a vertically-aligned (VA) LCD having domain-regulating means according to an embodiment disclosed in EP 0884626.
Figure 1B:
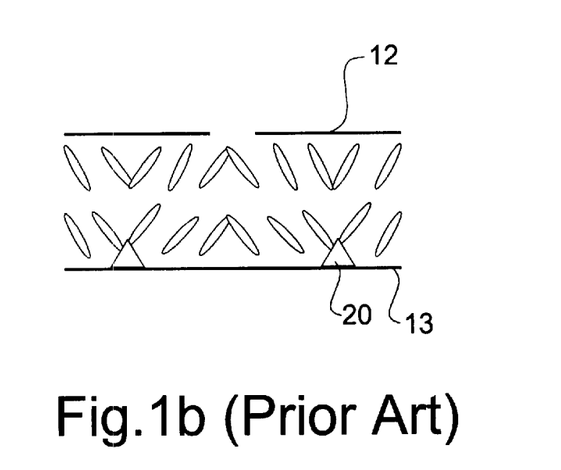
Figure 1C:
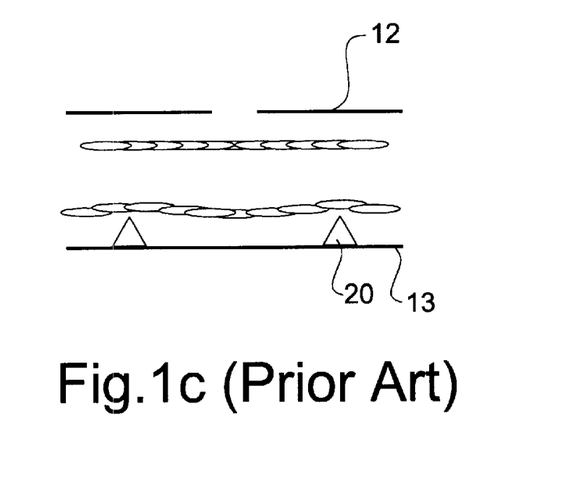
Figure 2:
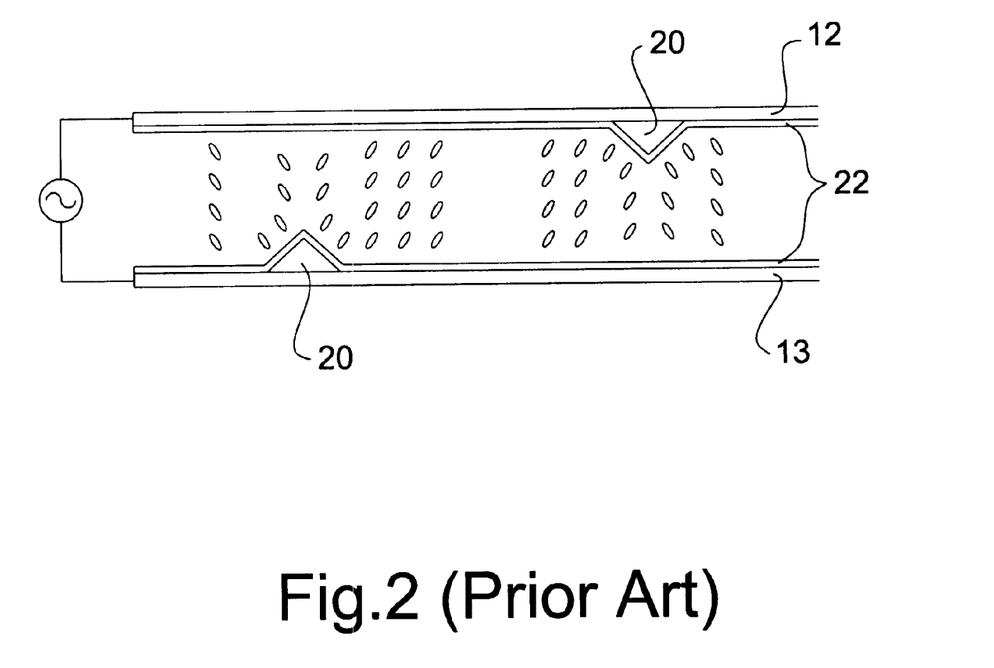
FIG. 2 is a diagram for explaining a panel structure and an operational principle of a VA LCD having domain-regulating means according to another embodiment disclosed in EP 0884626.

In FIGS. 1a to 1c, as the domain regulating means, pixel electrodes 12 on a TFT (Thin Film Transistor) substrate are slitted, and the common electrode 13 on a CF (color filter) substrate is provided with protrusions 20. As shown in FIG. 1a, in a state in which no voltage is applied, liquid crystal molecules are aligned vertically to the surfaces of the substrates. When an intermediate voltage is applied, as shown in FIG. 1b, electric fields oblique to the surfaces of the substrates are produced near the slits of the electrodes (edges of the electrodes). Moreover, liquid crystal molecules near the protrusions 20 slightly tilt relative to their state while no voltage is applied. The inclined surfaces of the protrusions 20 and the oblique electric fields generated between the substrates determine the directions in which the liquid crystal molecules are tilted. The orientation of the liquid crystal is divided into different directions along a plane defined by each pair of protrusions 20 and the center of each slit thereby improving viewing angle performance. FIG. 2 shows another example of realizing the domain regulating means by providing protrusions 20 alternately on the electrodes 12 and 13, and coated with the vertical alignment films 22. When no voltage is applied, the liquid crystal molecules are aligned vertically to the surfaces of the substrates in principle. On the inclined surfaces of the protrusions, however, the liquid crystal molecules are aligned at a little tilt. When a voltage is applied as shown in FIG. 2, the liquid crystal molecules are tilted in different directions.

Figure 3:
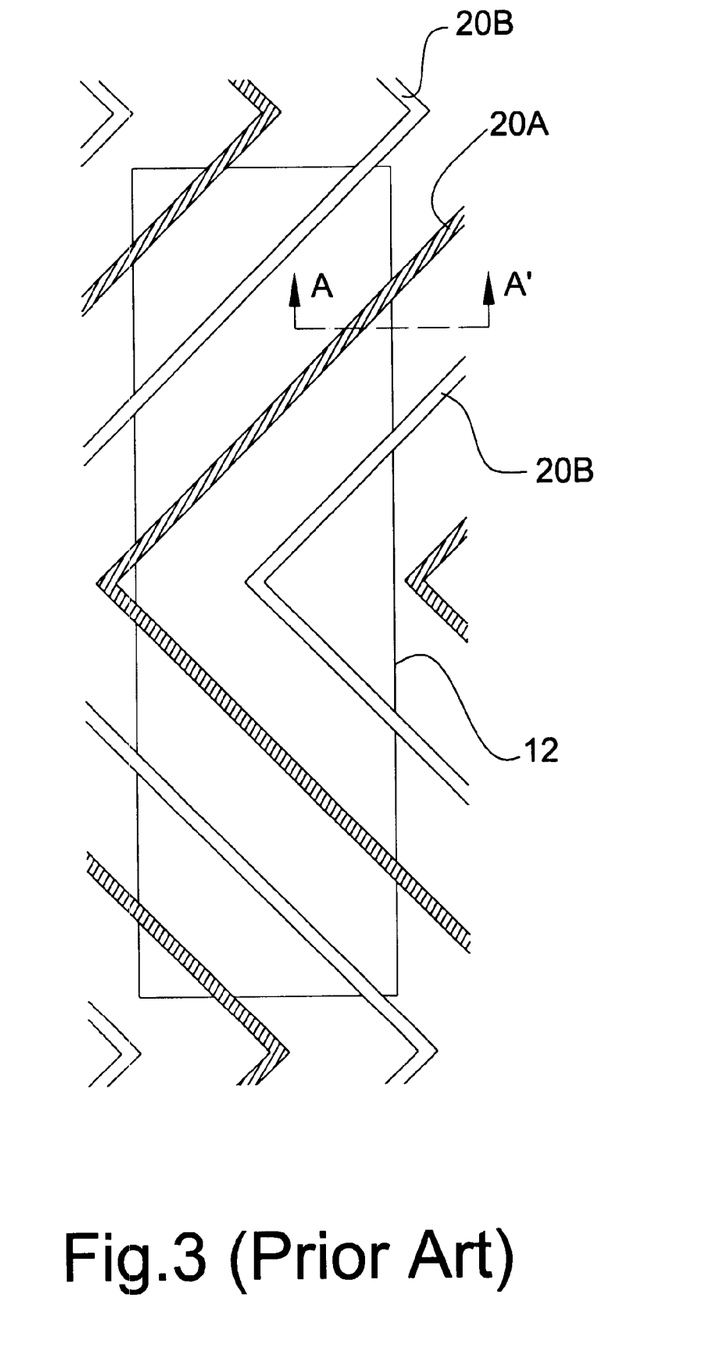
FIG. 3 is a diagram showing a plan view of pixel portions of another preferred embodiment disclosed in EP 0884626.

FIG. 3 is a diagram showing a plan view of pixel portions of another preferred embodiment disclosed in EP 0884626. As illustrated, the protrusions 20A and 20B are zigzagged alternately on the TFT substrate and the CF substrate. In this case, it is found that a part of display pixels appears darkened. In the region appearing black in the pixel, the change in the orientation of the liquid crystal molecules is found to be very slow upon application of a voltage. This reduces the contrast and the response speed, thereby deteriorating the display quality.

Figure 4:
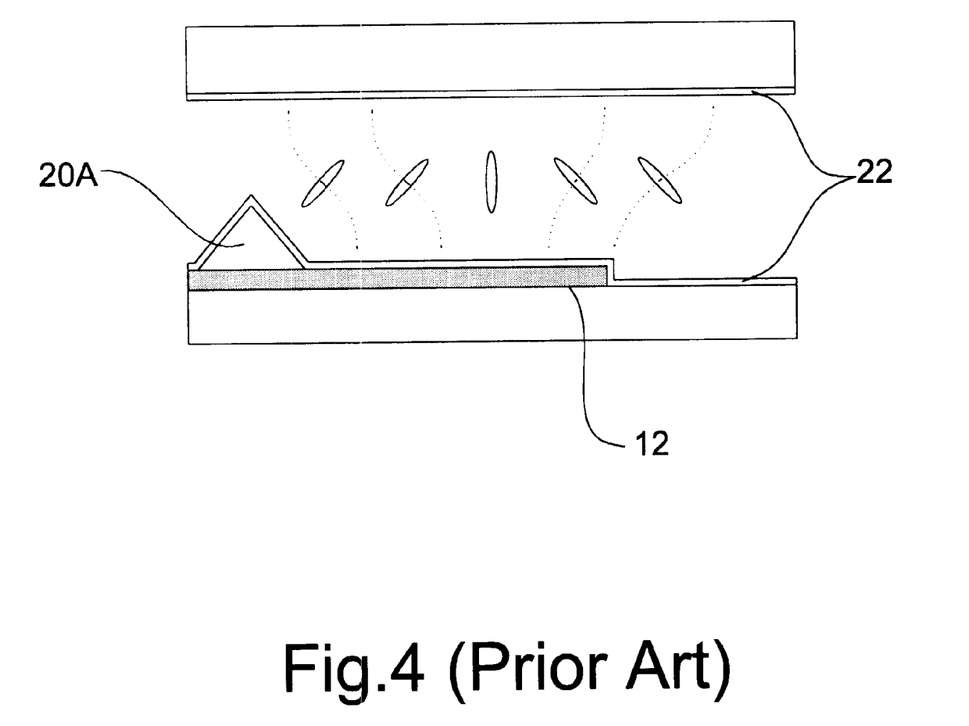
FIG. 4 shows, in a sectional view taken from line A–A' in FIG. 3, the alignment of liquid crystal molecules near the edge of the pixel electrode.

FIG. 4 is a sectional view taken from line A–A' in FIG. 3. As shown, the direction of the electric field is inclined near the edge of the pixel electrode 12. The liquid crystal molecules near the edge are tilted in the direction perpendicular to the electric field. Thus, the direction in which the liquid crystal molecules are tilted by the inclined electric field near the edge of the pixel electrode 12 is considerably different from the tilting direction due to the protrusions 20A. This results in disclination generating at the border between the domain formed by the edge of the pixel electrode 12 and the domain formed by the protrusions 20A. Therefore, a blackening region is shown in the vicinity of the edge of the pixel electrode.

Figure 5:
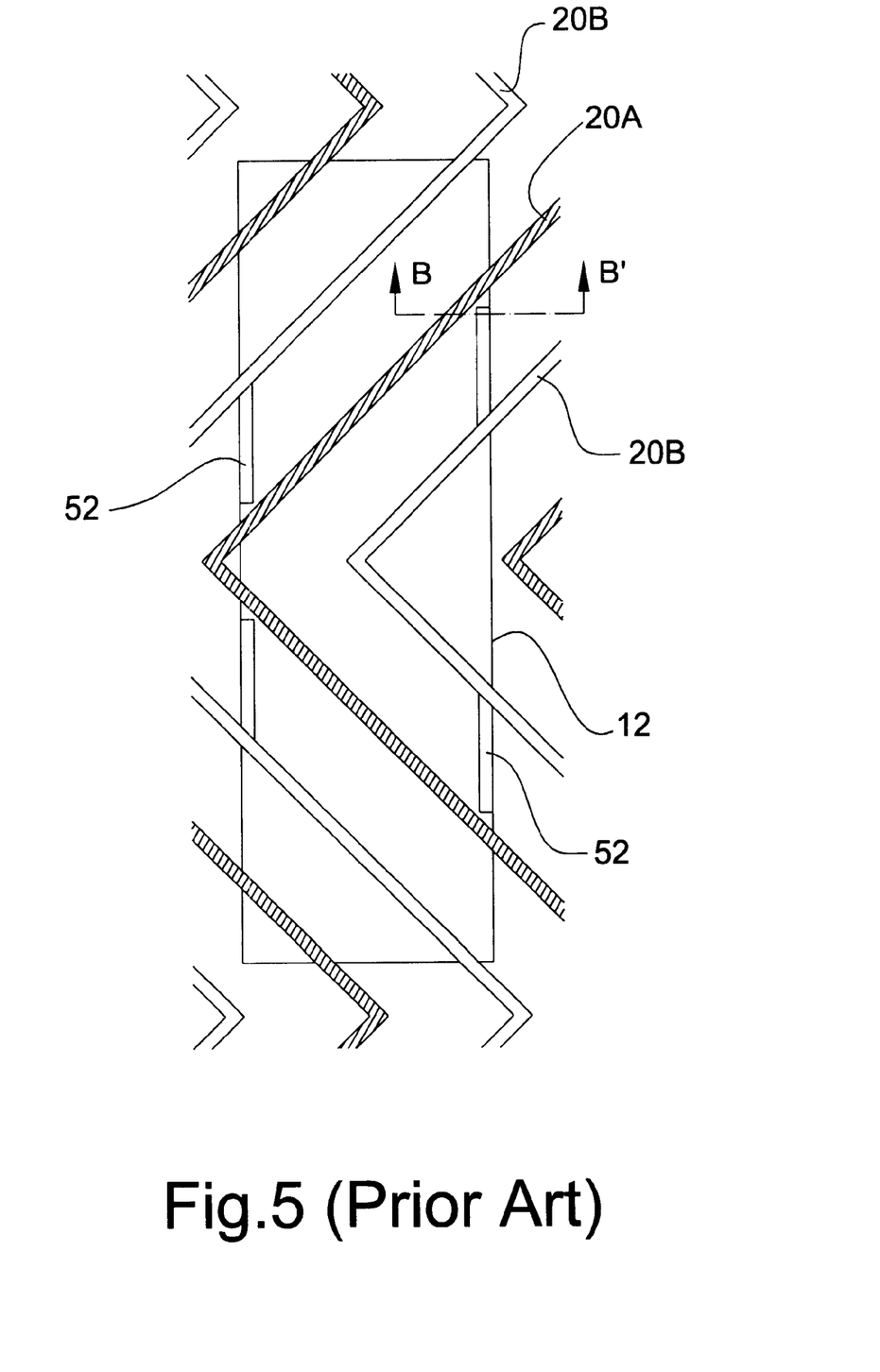
FIG. 5 is a plan view of pixel portions showing a specific protrusion arrangement pattern according to still another preferred embodiment disclosed in EP 0884626.
Figure 6:
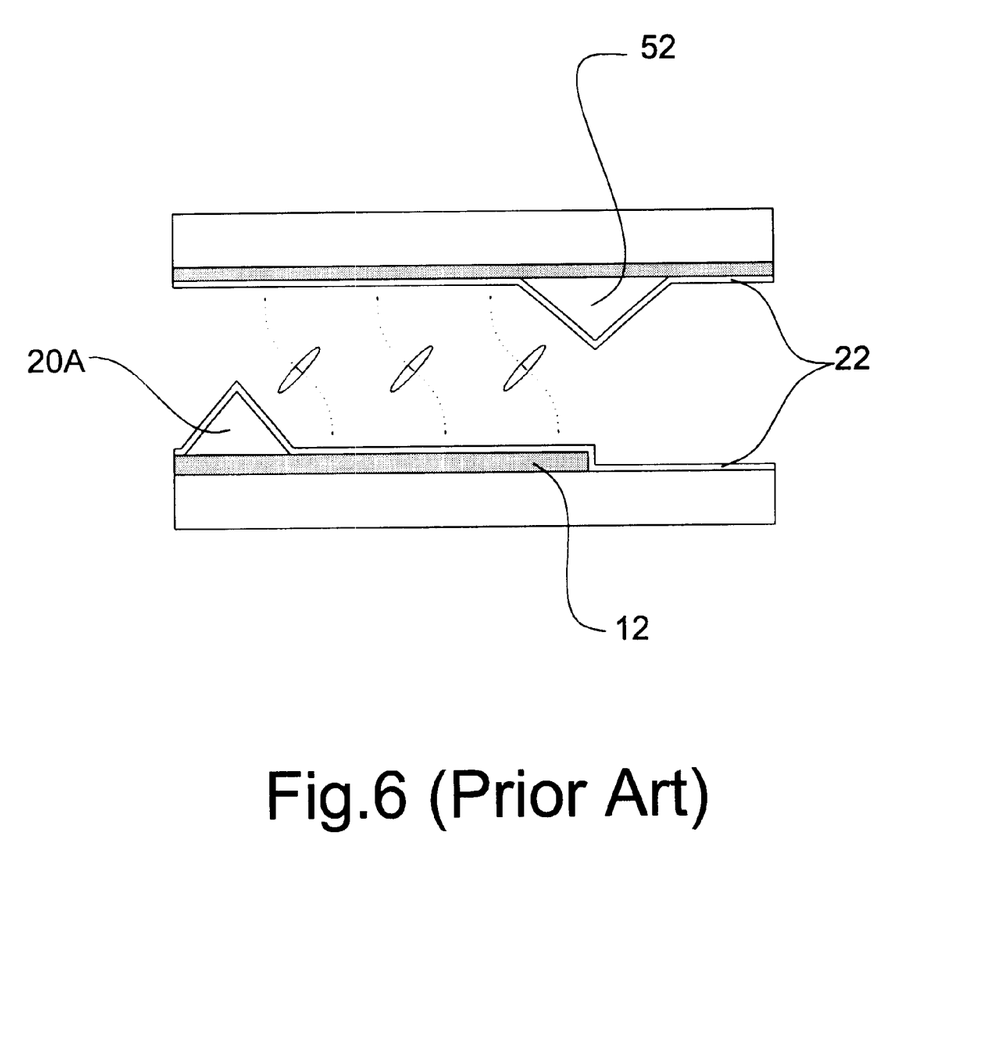
FIG. 6 shows, in a sectional view taken from line B–B' in FIG. 5, the alignment of liquid crystal molecules near the edge of the pixel electrode.

EP 0884626 further discloses a specific protrusion arrangement pattern for solving the problem described above. As illustrated in FIG. 5, protrusion wings 52 are formed in the vicinity of blackening regions. This protrusion wing 52 is connected to and integrally formed with the protrusion arrangement 20B formed on the CF substrate. FIG. 6 is a sectional view taken from line B–B' in FIG. 5. As shown, the direction in which the liquid crystal molecules are tilted by the protrusion wings 52 near the edge of the pixel electrode 12 coincides with the tilting direction due to the protrusions 20A. Therefore, no region appearing dark in the vicinity of the edge of the pixel electrode is observed. However, when the protrusion wings 52 are formed on the CF substrate, during black display, the liquid crystal lying in the gaps between the protrusions are seen black, but additional light leaks out through the liquid crystal near the protrusion wings 52. Thus, it deteriorates the density for black display as well as the contrast.

The present invention therefore seeks to provide a VA LCD that overcomes, or at least reduces the above-mentioned problems of the prior art.

SUMMARY OF THE INVENTION

It is a primary object of the present invention to provide a vertically-aligned (VA) LCD having a TFT substrate with specific protrusion or slit pattern which substantially obviates one or more problems due to limitations and disadvantages of the prior art.

To achieve the object described above, the present invention provides a liquid crystal display device comprising: a first substrate and a second substrate processed for vertical alignment; a liquid crystal having a negative dielectric constant anisotropy and being sandwiched between the first and second substrates; an array of first protrusions on the first substrate, each of the first protrusions being bent in zigzag, the first protrusions being arranged in parallel to one another with a predetermined pitch among them; a plurality of pixel electrodes on the second substrate; and an array of second protrusions or slits provided on the pixel electrodes, each extending in a direction, the second protrusions or slits being arranged in parallel to one another. The liquid crystal display device of the present invention is characterized that the angle included between the edge of the pixel electrodes and the extending direction of the second protrusions or slits is kept at least 135 degrees, and the angles included between the extending direction of the first protrusions and the extending direction of the second protrusions or slits as well as the edge of the pixel electrode are both kept at most 45 degrees. This significantly suppresses disclination occurring at the border between the domain formed by the edge of the pixel electrode and the domain formed by the second protrusions or slits.

In the liquid crystal display in accordance with the present invention, it provides a specific design of protrusions or electrode slits to suppress disclination. Specifically, each of the pixel electrodes has triangular indentations formed corresponding to the bends of the first protrusions, and each of the second protrusions or slits is disposed between the apexes of the triangular indentations and corresponding bends of the first protrusions. In a preferred embodiment, the first protrusions are arranged in a manner that the pitch therebetween coincides with an arrangement pitch of the pixel electrodes. Preferably, the zigzagged protrusions are substantially formed inside areas on the first substrate corresponding to the pixel electrodes on the second substrate.

The liquid crystal display in accordance with the present invention is designed to have a specific protrusion or slit pattern which satisfies that the angle included between the edge of the pixel electrodes and the protrusions or slits is kept at least 135 degrees, and the angles included between the first protrusions and the second protrusions or slits as well as the edge of the pixel electrode are both kept at most 45 degrees. Hence, the display defect resulting from disclination can be avoided.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Regarding the problem occurred in a VA LCD using zigzag protrusions as described in the above prior arts, the inventor has studied mechanism by which disclination occurred, and found out that if the angle included between the edge of the pixel electrodes and the protrusions or slits provided thereon is kept at least 135 degrees, occurrence of disclination is greatly suppressed.

Figure 7:
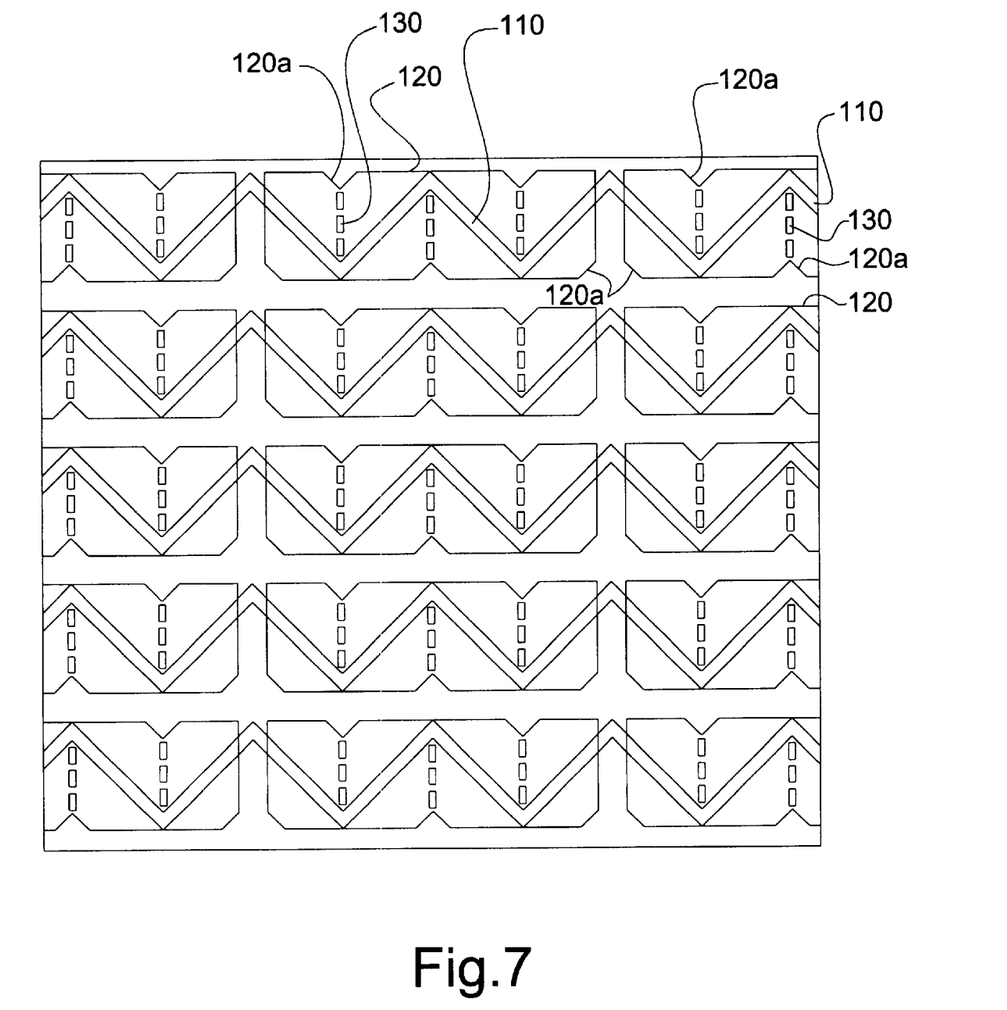
FIG. 7 is a plan view of pixel portions of a VA LCD showing specific protrusion and slit pattern according to a preferred embodiment of the present invention.

FIG. 7 is a plan view of pixel portions of a VA LCD showing specific protrusion and slit pattern according to a preferred embodiment of the present invention. The liquid crystal display device according to the present invention mainly comprises a first substrate and a second substrate. The surfaces of the substrates are processed for vertical alignment. A liquid crystal having a negative dielectric constant anisotropy is sealed in between the two substrates. As shown, the VA LCD of the present invention is characterized by including an array of first protrusions 110 on the first substrate, a plurality of pixel electrodes 120 on the second substrate; and an array of slits 130 on the pixel electrodes. The first protrusions 110 are bent in zigzag and arranged in parallel to one another with a predetermined pitch among them. All of the slits 130 extend in the same direction and are arranged in parallel to one another. Each of the pixel electrodes 120 has triangular indentations 120*a* formed corresponding to the bends of the first protrusions 110, and each of the slits 130 is disposed between the apexes of the triangular indentations 120*a* and corresponding bends of the first protrusions 110. It is noted that the angle included between the edge of the pixel electrodes and the extending direction of the slits 130 is about 135 degree. Preferably, each of the pixel electrodes 120 has corners where the cutting line 120*a* is parallel to the first protrusions 110. It should be understood that the slits 130 may be replaced by protrusions of dielectric material (not shown) formed on the pixel electrodes 120.

Figure 8:
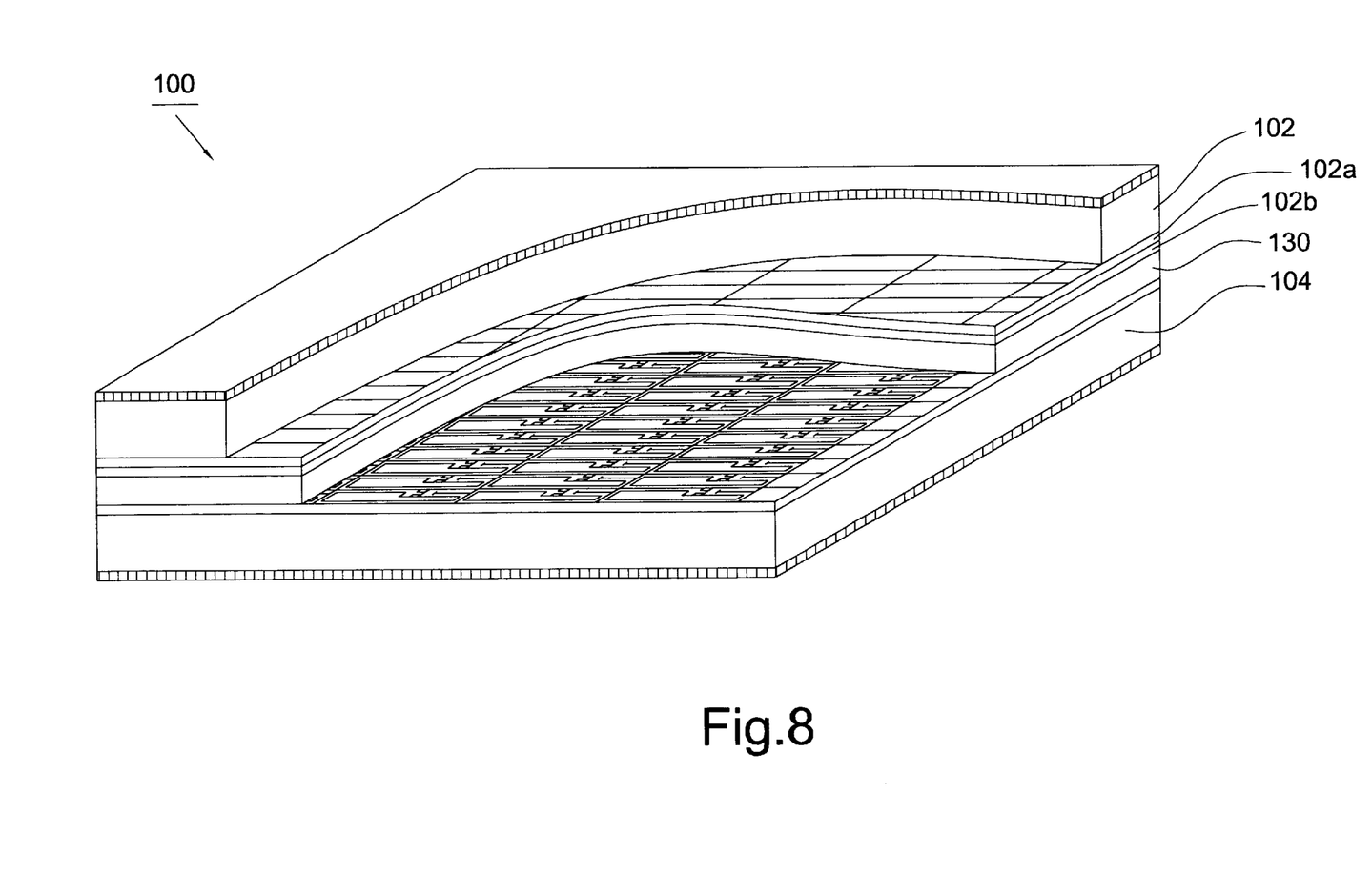
FIG. 8 is a cross sectional view of a portion of a VA LCD according to a preferred embodiment of the present invention.

Preferably, the VA LCD of the present invention is a TFT LCD. As shown in FIG. 8, the first substrate 102 is provided with a plurality of color filters 102*a* and a common electrode 102*b*. The second substrate 104 is provided with a plurality of scan bus lines formed in parallel to one another, a plurality of data bus lines, vertically to the scan bus lines, formed in parallel to one another, and TFTs and pixel electrodes 120 formed like a matrix at intersections between the scan bus lines and data bus lines. The surfaces of the substrates are processed for vertical alignment. A negative liquid crystal is sealed in between the two substrates. Typically, the first substrate 102 is referred to as a color filter (CF) substrate because color filters are formed, while the second substrate 104 is referred to as a TFT substrate. Usually, spacers (not shown) are formed between the substrates for defining the gap between the substrates.

Figure 9:
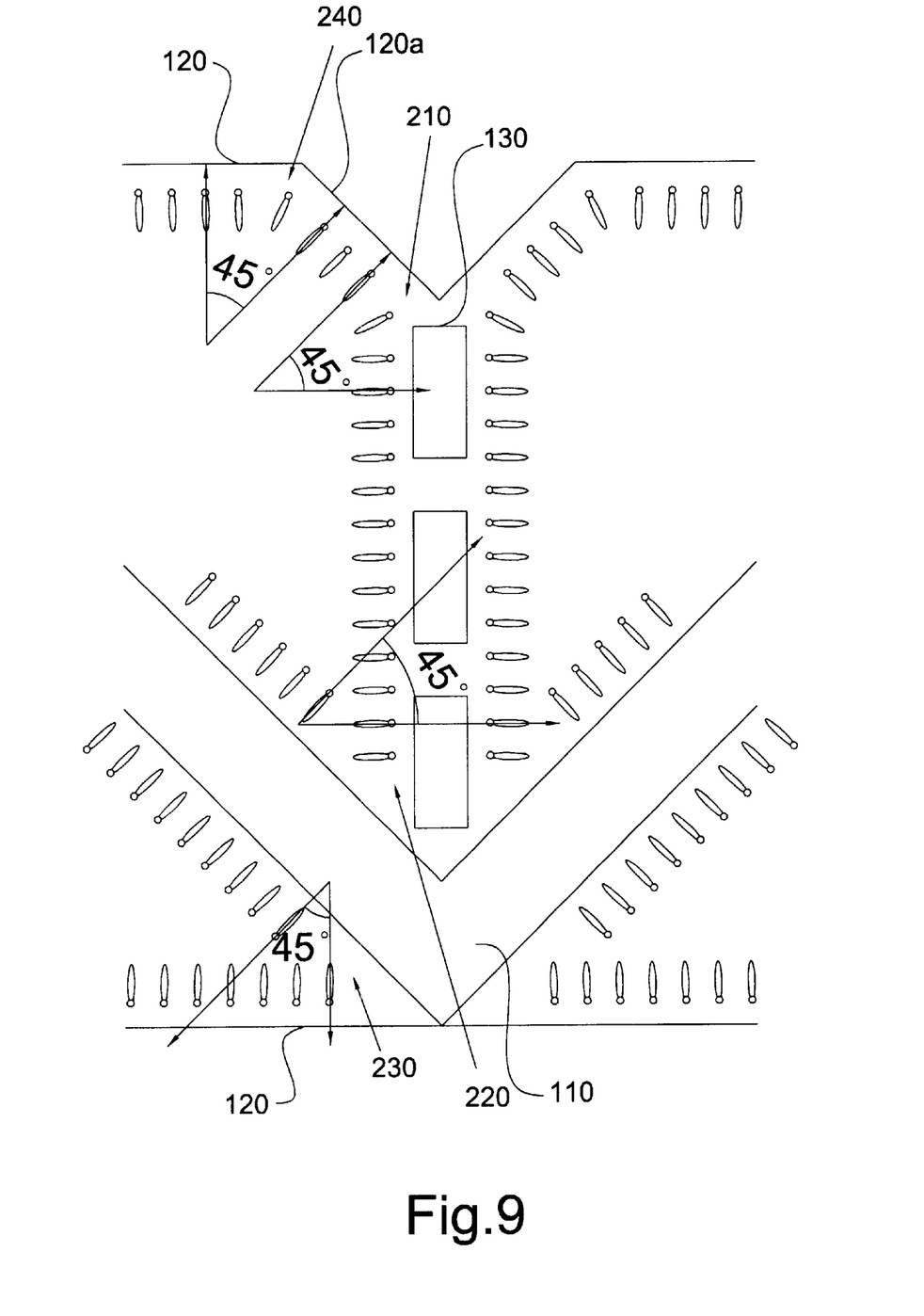
FIG. 9 shows, in an enlarged plan view, the alignment of liquid crystal molecules within a portion of a pixel of FIG. 7.

FIG. 9 shows the alignment of liquid crystal (LC) molecules within a portion of a pixel of FIG. 7 when a voltage is applied. As shown, the LC molecules around the intersection area 210 are disposed in two different directors due to the edge of the triangular indentation 120*a* and the slit 130. As used in the present invention, the word "director" means "the average direction of the long axes of the LC molecules". It is noted that the difference between the directors of the LC molecules around the intersection area 210 is significantly reduced down to at most 45 degrees when the angle included between the edge of the triangular indentation 120*a* of the pixel electrode 120 and the slit 130 is kept at least 135 degrees. This significantly suppresses disclination occurring at the border between the domain formed by the edge of the triangular indentation 120*a* and the domain formed by the slit 130. For the LC molecules around the intersection area 220, they are also aligned to two different directors due to the protrusion 110 on the first substrate and the slit 130 on the second substrate. It is noted that the difference between the directors of the LC molecules around the intersection area 220 is significantly reduced down to at most 45 degrees when the angle included between the protrusion 110 and the slit 130 is kept at most 45 degrees. This also significantly suppresses disclination occurring at the border between the domain formed by the protrusion 110 and the domain formed by the slit 130. Therefore, when (A) the angle included between the edge of the pixel electrode 120 and the slit 130 is kept at least 135 degrees and (B) the angles included between the protrusion 110 and the slit 130 as well as between the protrusion 110 and the edge of the pixel electrode 120 are both kept at most 45 degrees, the difference between the directors of the LC molecules around all intersection areas 210, 220, 230, 240 will be kept at most 45 degrees. This significantly reduces the occurrence of disclination. Next, processes for forming the protrusions of dielectric material will be described. When the protrusions 110 are formed on the CF substrate, a photoresist is coated on the surfaces thereof, transferred a predetermined pattern (referring to the zigzagged pattern showed in FIG. 7), and then developed to form the protrusions 110. This process is easily carried out by using conventional techniques. Even when protrusions are formed as a pattern like the array of slits 130 shown in FIG. 7 on the pixel electrode 130, nearly the same process as the foregoing one is adopted. However, this process needs an additional step of creating the pattern of protrusions on the TFT substrate. Since the slits 130 can be formed integrally with the pixel electrode 120 by utilizing the conventional process of pixel electrode forming step, it is desired to form slits instead of protrusions on the TFT substrate. When the pixel electrodes are slitted, a pattern having slitted pixel electrodes as shown in FIG. 7 should be created at the pixel electrode forming step.

Although the invention has been explained in relation to its preferred embodiment, it is to be understood that many other possible modifications and variations can be made without departing from the spirit and scope of the invention as hereinafter claimed.

What is claimed is:

1. A liquid crystal display device comprising:
    a first substrate and a second substrate processed for vertical alignment;
    a liquid crystal having a negative dielectric constant anisotropy and being sandwiched between the first and second substrates;
    an array of first protrusions on the first substrate, each of the first protrusions being bent in zigzag, the first protrusions being arranged in parallel to one another with a predetermined pitch among them;
    a plurality of pixel electrodes on the second substrate; and
    an array of second protrusions or slits provided on the pixel electrodes, each extending in a direction, the second protrusions or slits being arranged in parallel to one another,
    wherein angles included between all of the edges of the pixel electrodes adjacent to the second protrusions or slits and the extending direction of the second protrusions or slits are at least 135 degrees.

2. The liquid crystal display device as claimed in claim 1, wherein angles included between the extending direction of the first protrusions and the extending direction of the second protrusions or slits as well as between the extending direction of the first protrusions and the edge of the pixel electrodes are both kept at most 45 degrees.

3. The liquid crystal display device as claimed in claim 2, wherein the predetermined pitch among the first protrusions coincides with an arrangement pitch of the pixel electrodes.

4. The liquid crystal display device as claimed in claim 3, wherein the first protrusions are substantially formed inside areas on the first substrate corresponding to the pixel electrodes.

5. The liquid crystal display device as claimed in claim 1, wherein each of the pixel electrodes has two long opposite edges and two short opposite edges, and all of the second protrusions or slits are arranged generally parallel to the short edges of the pixel electrodes.

6. The liquid crystal display device as claimed in claim 1, wherein all of the second protrusions or slits provided on one pixel electrode are divided into groups, and the second protrusions or slits of each group are substantially formed in a line and separated from each other.

7. A liquid crystal display device comprising:
    a first substrate and a second substrate processed for vertical alignment;
    a liquid crystal having a negative dielectric constant anisotropy and being sandwiched between the first and second substrates;
    an array of first protrusions on the first substrate, each of the first protrusions being bent in zigzag, the first protrusions being arranged in parallel to one another with a predetermined pitch among them;
    a plurality of pixel electrodes on the second substrate; and
    an array of second protrusions or slits provided on the pixel electrodes, each extending in a direction, the second protrusions or slits being arranged in parallel to one another,
    wherein an angle included between the edge of the pixel electrodes and the extending direction of the second protrusions or slits is at least 135 degrees,
    wherein angles included between the extending direction of the first protrusions and the extending direction of the second protrusions or slits as well as between the extending direction of the first protrusions and the edge of the pixel electrodes are both kept at most 45 degrees,
    wherein the predetermined pitch among the first protrusions coincides with an arrangement pitch of the pixel electrodes,
    wherein the first protrusions are substantially formed inside areas on the first substrate corresponding to the pixel electrodes, and
    wherein each of the pixel electrodes has triangular indentations formed corresponding to the bends of the first protrusions, and each of the second protrusions or slits is disposed between the apexes of the triangular indentations and corresponding bends of the first protrusions.

8. The liquid crystal display device as claimed in claim 7, wherein each of the pixel electrodes has at least a corner being cut in a manner that the cutting line is parallel to the first protrusions.

9. A liquid crystal display device comprising:
    a first substrate and a second substrate processed for vertical alignment;
    a liquid crystal having a negative dielectric constant anisotropy and being sandwiched between the first and second substrates;
    an array of first protrusions on the first substrate, each of the first protrusions being bent in zigzag, the first protrusions being arranged in parallel to one another with a predetermined pitch among them;

a plurality of pixel electrodes on the second substrate; and an array of second protrusions or slits provided on the pixel electrodes, each extending in a direction, the second protrusions or slits being arranged in parallel to one another, wherein an angle included between the edge of the pixel electrodes and the extending direction of the second protrusions or slits is at least 135 degrees, and wherein each of the pixel electrodes has triangular indentations formed corresponding to the bends of the first protrusions, and each of the second protrusions or slits is disposed between the apexes of the triangular indentations and corresponding bends of the first protrusions.

10. The liquid crystal display device as claimed in claim 9, wherein each of the pixel electrodes has at least a corner being cut in a manner that the cutting line is parallel to the first protrusions.

11. A liquid crystal display device comprising:

a first substrate and a second substrate processed for vertical alignment;

a liquid crystal having a negative dielectric constant anisotropy and being sandwiched between the first and second substrates;

an array of first protrusions on the first substrate, each of the first protrusions being bent in zigzag, the first protrusions being arranged in parallel to one another with a predetermined pitch among them;

a plurality of pixel electrodes on the second substrate; and an array of second protrusions or slits provided on the pixel electrodes, each extending in a direction, the second protrusions or slits being arranged in parallel to one another, wherein each of the pixel electrodes has triangular indentations formed corresponding to the second protrusions or slits.

12. The liquid crystal display device as claimed in claim 11, wherein each of the pixel electrodes has two long opposite edges and two short opposite edges, and all of the second protrusions or slits are arranged In parallel to the short edges of the pixel electrodes.

13. The liquid crystal display device as claimed in claim 11, wherein all of the protrusions or slits provided on one pixel electrode are divided into groups, and the protrusions or slits of each group are substantially formed in a line and separated from other.

* * * * *